Jan. 13, 1970  AKIO NAKANO  3,489,257
FLUID PRESSURE CLUTCH OPERATOR WITH AUTOMATIC SHOP ADJUSTER
Filed March 27, 1968  3 Sheets-Sheet 1

AKIO NAKANO,
INVENTOR.

BY Wenderoth, Lind
and Ponack. Attorneys

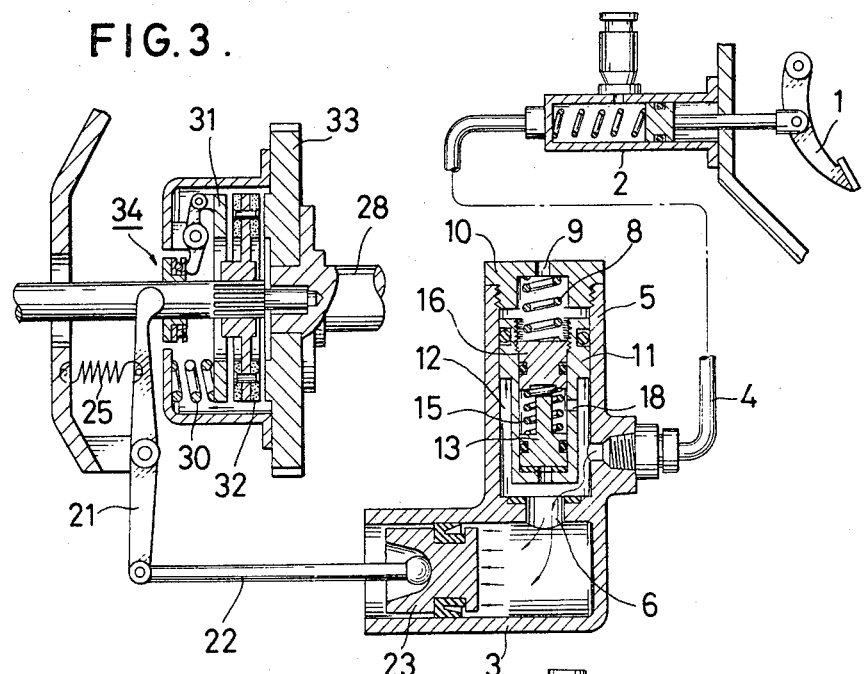
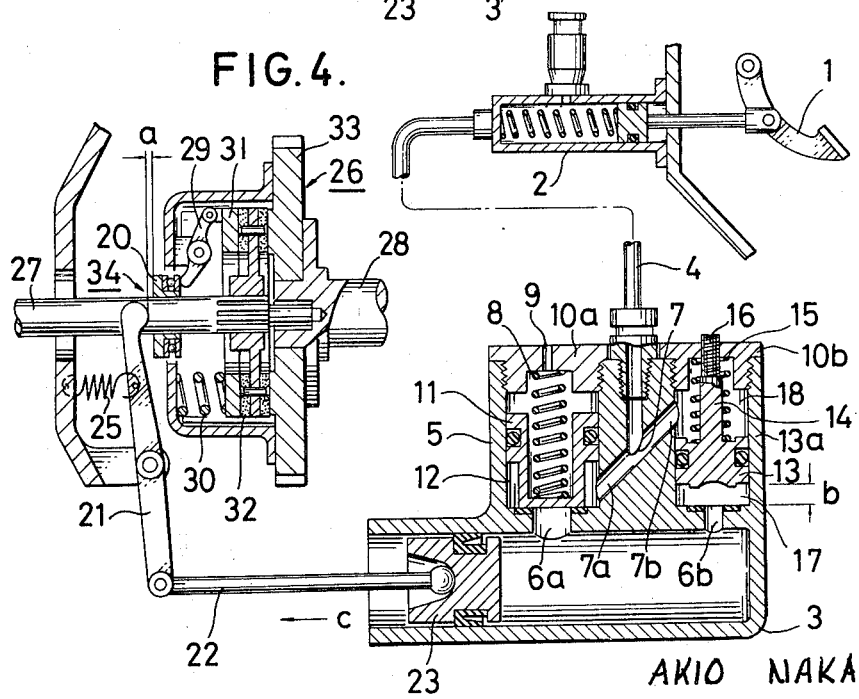

AKIO NAKANO, INVENTOR.

United States Patent Office 3,489,257
Patented Jan. 13, 1970

3,489,257
FLUID PRESSURE CLUTCH OPERATOR WITH AUTOMATIC GAP ADJUSTER
Akio Nakano, Tokyo, Japan, assignor to Kabushiki Kaisha Daikin Seisakusho, Neyagawa, Japan
Filed Mar. 27, 1968, Ser. No. 716,472
Int. Cl. F16d *11/00*
U.S. Cl. 192—111                       4 Claims

ABSTRACT OF THE DISCLOSURE

An automatic adjusting apparatus for the clutch for a motor car which maintains a constant gap between a release yoke and a release bearing, movement of the release yoke being controlled in two steps by means of both a switching valve interposed between oil paths connecting a master cylinder with a release cylinder and a piston for forming the gap.

---

The present invention relates to an apparatus for automatically adjusting the gap of a clutch for a motor car which apparatus maintains a constant gap between a release yoke and a release bearing of the clutch.

In the clutch of a motorcar, when the clutch facing becomes worn, the pressure plate is moved forward by an amount equal to the amount of wear. Because of this the pre-set gap between the yoke and the release bearing is gradually narrowed and finally disappears. If this happens during transmission of power, further advancement of the pressure plate becomes impossible, and the clutch plate begins to slip.

In the past this slippage has been avoided by providing an adjustable clevis fitted between an end of the release yoke and a release rod, so that the gap could be manually periodically reset. But this takes much time and money and is inconvenient.

This invention has been proposed in light of these disadvantages and is based on the fact that it has been found that a more effective and proper means for correcting slippage allows return movement of the release yoke in two steps by means of both a switching valve interposed between oil paths connecting a master cylinder with a release cylinder and a piston for forming the pre-set gap.

One of the chief objects of this invention is to provide a special apparatus which maintains a constant gap between the release yoke and the release bearing regardless of the wear of the clutch facing.

Another object of this invention is to provide an apparatus which smoothly and certainly adjusts the gap between said release yoke and said release bearing.

A further object of this invention is to provide a simplified apparatus for adjusting the gap.

To attain each object above-mentioned, the invention comprises a switching valve which positions a release piston to correspond to the amount of wear of the clutch facing and which closes oil paths at the moment when the release yoke has separated from the release bearing, but which allows reciprocating motion of said release piston to open said oil paths when the release yoke is in contact with the release bearing; and a piston for forming a gap proportional to the pre-set gap between the release yoke and the release bearing, said piston allowing said release piston to recede a definite amount.

Further objects of the present invention will be made clear by the following description accompanied by the drawings.

In the drawings:

FIGS. 1–3 show a first embodiment of the present invention wherein FIG. 1 is a vetrical side view showing full engagement of a clutch, FIG. 2 is a vertical side view showing partial engagement of a clutch, and FIG. 3 is a vertical side view showing the clutch disengaged.

FIG. 4 shows another embodiment of the present invention, being a vertical side view showing full engagement of the clutch;

FIG. 5 and FIG. 6 show a further embodiment of the invention wherein FIG. 5 is a vertical side view showing full engagement of the clutch and FIG. 6 is a vertical side view showing the clutch disengaged.

Figure 1:
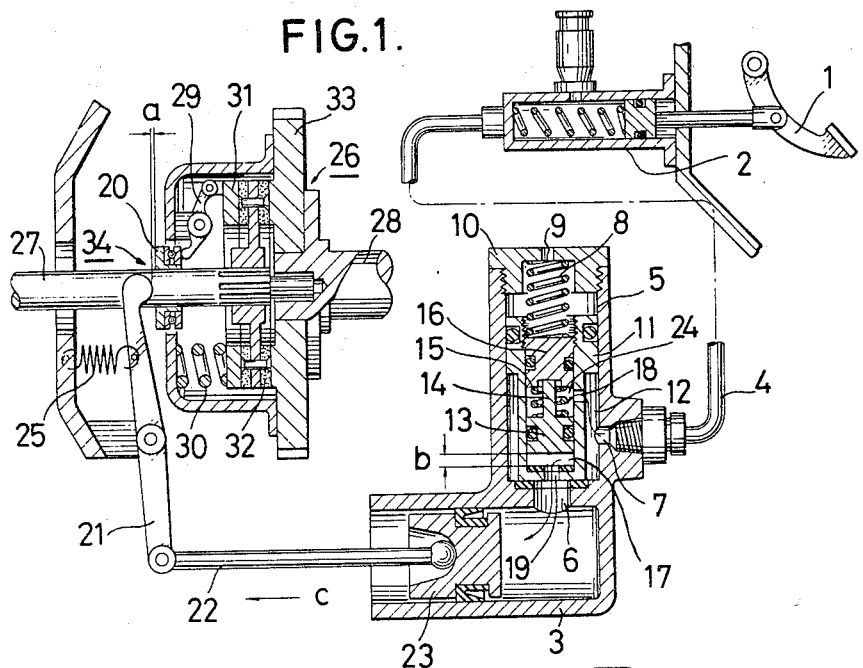
Figure 2:
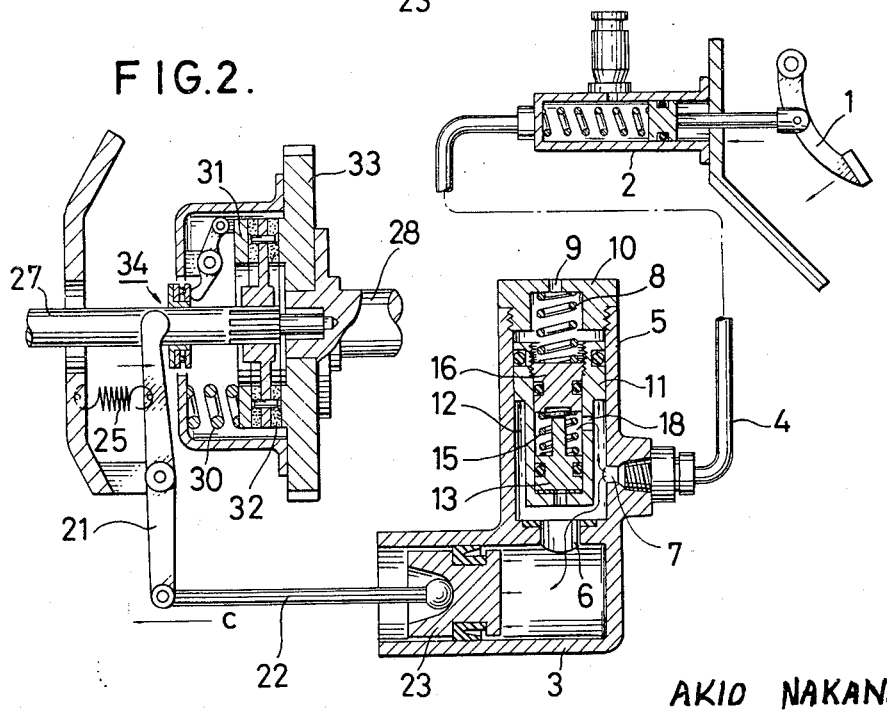

The invention in the form of the preferred embodiment as shown in FIGS. 1 to 3 comprises a clutch pedal 1, a master cylinder 2, a release cylinder 3 connected with cylinder 2 through an oil path 4, a valve cylinder 5 in communication with cylinder 3 and oil path 4 through flow paths 6 and 7, respectively, and hollow cylinder valve 11 slidable within valve cylinder 5 and operable to close flow path 6. A stopper 16 is screwed into the upper hollow part of valve 11. Into the upper part of valve cylinder 5 a lid 10 having an air hole 9 is screwed. A spring 8 is interposed between lid 10 and stopper 16 to thereby bias valve 11 downwardly toward a valve seat. A gap 12 is formed between the lower part of valve 11 and the valve cylinder 5 and communicates with flow path 7. A piston 13 is mounted to reciprocate inside valve 11, between stopper 16 and the bottom portion of valve 11. Piston 13 has a reduced portion 14 surrounded by a spring 15 which biases piston 13 away from stopper 16. An advancing chamber 17 of oil provides a gap *b* between piston 13 and the bottom of valve 11.

Orifice 19 in valve 11 connects advancing chamber 17 with orifice 6, and orifice 18 in valve 11 connects gap 12 with a chamber 24 formed between the reduced portion 14 of piston 13 and the interior of valve 11. A release piston 23 is positioned in cylinder 3 and acts on one end of rod 22. The other end of rod 22 is pivoted to release yoke 21. Release spring 25 biases yoke 21 away from release bearing 20 and biases rod 22 toward release piston 23. The location of piston 23 locates yoke 21 from release bearing 20 by a definite gap *a*, for example, 1.7 mm. A known clutch assembly 26 comprises a main shaft 27, a crankshaft 28, a release lever 29, a release lever spring 20, a pressure plate 31, a clutch facing 32, and a flywheel 33. The stiffness of the springs increases in the order of 15, 25, 8, 30.

The operation of the above described embodiment of the invention is as follows. When clutch pedal 1 is depressed, oil is transmitted from the master cylinder 2 through the oil path 4 and into chamber 24 through orifice 18 thereby pressing piston 13 downward. As a consequence, the piston 13 forces oil from advancing chamber 17 through orifice 19 into release cylinder 3, thereby moving release piston 23 and rod 22 in the direction of arrow C. Rod 22 forces yoke 21 to rotate in a clockwise direction against the force of the release spring 25. When oil within the advancing chamber 17 is completely removed and the gap *b* vanishes, yoke 21 contacts release bearing 20. Further depression of clutch pedal 1 causes oil within gap 12 to raise valve 11 as shown in FIG. 2 against the spring 8, thereby allowing oil to flow directly from oil path 4 to release cylinder 3 through flow paths 7 and 6. Consequently release piston 23 advances further to the left causing yoke 21 to press release bearing 20 and cause pressure plate 31 to disengage from clutch facing 32 as shown in FIG. 3. These actions result in the interruption of power transmission from crankshaft 28 to main shaft 27.

When clutch pedal 1 is released, yoke 21 is made to rotate counterclockwise by the force of the springs 25 and 30. Yoke 21 moves release piston 23 to the right through rod 22. Until the top end of yoke 21 disengages from release bearing 20, valve 11 will remain in the elevated position of FIG. 2, since the force of both springs 25 and 30 operate to force fluid from release cylinder 3 through flow path 6. When the top end of yoke 21 disengages from release bearing 20, the force of spring 8 overcomes the force of weaker spring 25, thereby causing valve 11 to descend. At this point, oil flow through flow path 6, gap 12 and flow path 7 is closed, thereby obstructing the return movement of release piston 23. But at this moment, since spring 15 is weaker than spring 25, spring 15 is compressed, and piston 13 is raised a definite distance represented by gap b until reduced portion 14 abuts against stopper 16. The upward movement of piston 13 forms advancing chamber 17 resulting in release piston 23 receding a definite distance from the position where its return movement was obstructed. Consequently, yoke 21 is separated from release bearing 20 by a definite gap a, for example 1.7 mm.

When the clutch facing 32 gradually becomes worn due to use, the top end of release lever 29 assumes a forwardly inclined position, and the lower end thereof pushes the release bearing 20 to the left, thereby gradually narrowing gap a.

If in such a condition clutch pedal 1 is depressed, pressure plate 31 is disengaged from clutch facing 32, thereby terminating transmission of power from the crankshaft 28 to the main shaft 27 in the same manner as stated above. However, when clutch pedal 1 is released, operation of the device is as follows.

The yoke 21 is made to rotate counterclockwise by the force of springs 25 and 30, as described above. Release piston 23 is also moved to the right by rod 22. However, it takes longer for the top end of yoke 21 to separate from release bearing 20 since the release bearing 20 has been displaced to the left by lever 29 due to the wearing of clutch facing 32. Since both springs 25 and 30 act for a longer increment of time, valve 11 does not descend until later than described above. Therefore release piston 23 moves to the right farther than described above, by an amount proportional to the amount of abrasion of the clutch facing 32. Also, when yoke 21 has separated from release bearing 20, valve 11 descends closing oil path 6. This causes pistons 13 and 23 to react as described above, piston 23 receding by the same definite amount, thereby forming the same definite gap 2, for example 1.7 mm., between yoke 21 and release bearing 20.

FIG. 4 is a second embodiment of the present invention, wherein valve cylinder 5 and cylinder 13a of piston 13 are fitted together on the upper part of release cylinder 3. A diverging oil path 7 is fitted at the end of an oil path 4, one diverging opening end 7a thereof into the lower part of valve cylinder 5, and the other diverging end 7b thereof into the back of cylinder 13a. The lower part of valve cylinder 5 into the back of the release cylinder 3. Release flow path 6b. A lid body 10a is attached to the upper part of valve cylinder 5 and a lid body 10b having a stopper piece 16 is attached to the upper part of cylinder 13a. The other elements are constructed and operate in the same manner as the first embodiment. A gap a is automatically adjusted in the same manner as in the embodiment shown in FIGS. 1 to 3.

Figure 5:
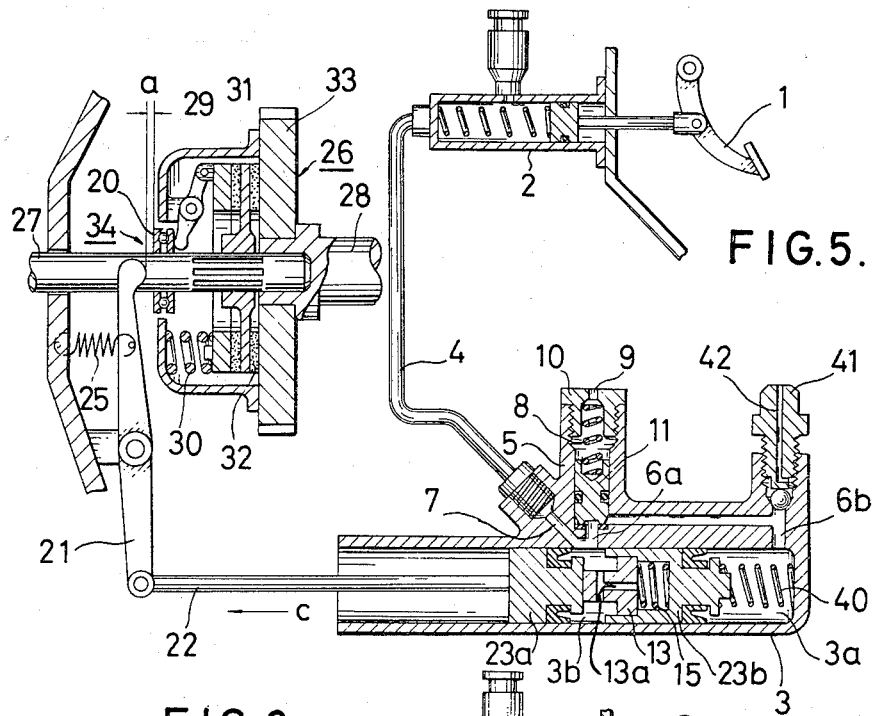
Figure 6:
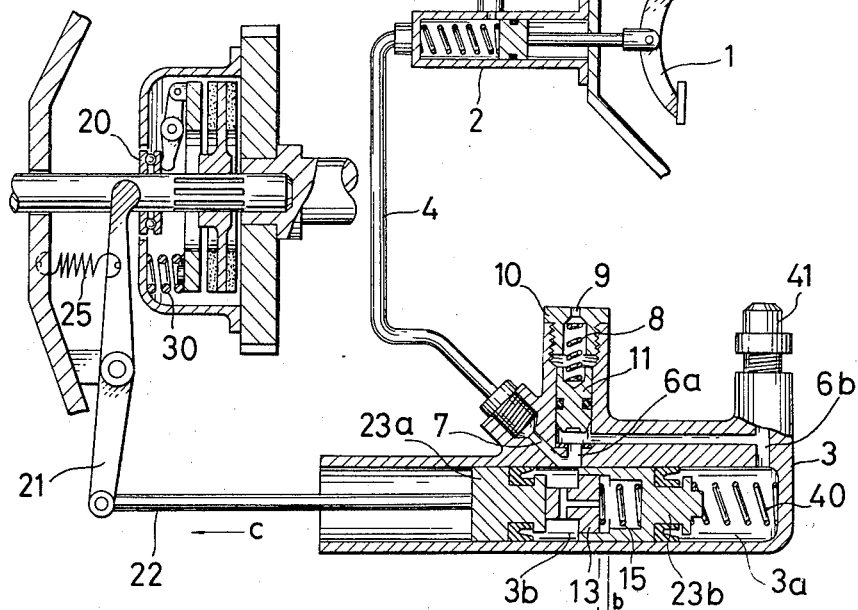

FIGS. 5 and 6 show a third embodiment, wherein valve cylinder 5 is fitted on the upper part of release cylinder 3. One flow path 6a extends from the lower part of valve cylinder 5 into the front part of release cylinder 3, and another flow path 6b extends from the lower part of valve cylinder 5 into the back of the release cylinder 3. Release pistons 23a and 23b fit inside release cylinder 3, piston 13 having an oil path 13a is positioned within a recess in piston 23b, spring 15 is interposed between pistons 13 and 23b, and spring 40 is interposed between piston 23b and release cylinder 3. The stiffness of the springs increases in the order of 40, 15, 25, 8, 30.

Screw 41 is attached to release cylinder 3, and air extractor passage 42 penetrates screw 41, In the apparatus of this embodiment, when oil is supplied to the release cylinder 3 through flow path 7 by depressing clutch pedal 1, release piston 23 is moved to the left, allowing yoke 21 to engage release bearing 20. Since at this time the pressure in the rear of the piston 13 through the oil path 13a is equal to the pressure in space 3b between pistons 23a and 13, pistons 13 and 23a are moved to the left by the force of spring 15, thereby forming a gap b (see FIG. 6). Further depression of clutch pedal 1 causes yoke 21 to contact release bearing 20. Thereafter, the force of spring 30 is opposed. Since spring 30 is stronger than spring 8, valve 11 is lifted, thereby enabling oil from flow paths 7, 6a and 6b to move the pistons 23a, 13 and 23b to the left, as shown in FIG. 6. The movement of these pistons causes rod 22 to move in the direction of arrow C, thereby separating pressure plate 31 from clutch facing 32 through yoke 21, release bearing 20, and release lever 29, resulting in the termination of power from crankshaft 28 to main shaft 27.

When clutch pedal 1 ils released, yoke 21 is made to rotate counterclockwise by means of springs 25 and 30, causing release piston 23a to return to the right through rod 22. Since until the top end of yoke 21 separates from the release bearing 20 springs 25 and 30 simultaneously act, cylinder valve 11 remains in the elevated position of FIG. 6. Oil flowing from space 3a in the back of release cylinder 3 to master cylinder 2 through flow paths 6b, 6a and 7 allows pistons 13 and 23b to return while maintaining gap b, as shown in FIG. 6. Since at the moment when the top end of yoke 21 separates from release bearing 20 the counterclockwise movement of yoke 21 is solely due to the force of spring 25, spring 8, stronger than spring 25, causes cylinder valve 11 to descend, thereby closing flow path 6b. As a result, oil existing in space 3a of release cylinder 3 cannot flow to the master cylinder 2 through flow path 6b, 6a and 7, and therefore operates to obstruct further return movement of release piston 23b. However, spring 25 is stronger than spring 15. Therefore, piston 13 is allowed to return an additional amount equal to gap b. As a result, piston 23a is allowed to further recede by the same additional amount. Accordingly, yoke 21, which has separated from release bearing 20, rotates counterclockwise a further definite amount to form a definite gap, for example 1.7 mm., between the top end thereof and release bearing 20.

In the event that clutch facing 32 has become worn, pistons 23a and 23b are allowed to return further by an amount proportional to the amount of abrasion of the clutch facing 32 in a manner the same as that of the apparatus shown in FIGS. 1 to 3. Further, since the piston 13 allows piston 23a to recede by a definite amount, a definite gap is always formed between yoke 21 and release bearing 20, regardless of the amount of abrasion of the clutch facing in a manner the same as that of the apparatus of the embodiment shown in FIGS. 1 to 3.

As mentioned above, three embodiments of the present invention are disclosed. However, the invention is not limited to such embodiments, but can be applied, for example to clutches of other vehicles similar to motor cars, and moreover can be performed with various alterations in design which do not deviate from the spirit of the invention.

What is claimed is:

1. An apparatus for automatically adjusting the gap between the release yoke and the release bearing of a motor vehicle clutch of the type having a master cylinder and a clutch pedal to compensate for wear of the clutch facing, a release cylinder having first and second flow paths and adapted to communicate with said master cylinder through said flow paths; a release rod positioned between said release yoke and said release piston; wherein depression of said clutch pedal causes fluid to flow from said master cylinder through said flow paths and into said release cylinder causing said release piston to move said release rod, thereby causing said release yoke to close said gap and disengage said clutch; switching valve means for closing one of said flow paths the moment said release yoke is disengaged from said release bearing, thereby obstructing the return movement of said release piston; and a piston means associated with said release cylinder for allowing said release piston to recede an additional predetermined amount proportional to said gap; whereby said gap is provided for regardless of the amount of wear of the clutch facing.

2. An apparatus as claimed in claim 1 wherein said switching valve is positioned between said flow paths and wherein said switching valve comprises the cylinder for said piston.

3. An apparatus as claimed in claim 1 wherein one of said flow paths opens into a first end of said release cylinder and said switching valve is interposed in said one flow path, and wherein the other of said flow paths opens into a second end of said release cylinder and said piston is interposed in said other flow path.

4. An apparatus as claimed in claim 1 wherein one of said flow paths opens into an end of said release cylinder and said switching valve is interposed in one flow path, and wherein said piston is positioned within said release cylinder.

References Cited

UNITED STATES PATENTS

| | | |
|---|---|---|
| 2,638,750 | 5/1953 | Hettinger. |
| 3,262,531 | 7/1966 | Blacket et al. _____ 192—111 X |
| 3,171,526 | 3/1965 | Waclawek _____ 192—111 |
| 3,307,667 | 3/1967 | Maurice _____ 192—111 XR |

BENJAMIN W. WYCHE III, Primary Examiner

U.S. Cl. X.R.

60—54.5